(12) United States Patent
Yamada et al.

(10) Patent No.: US 12,126,184 B2
(45) Date of Patent: Oct. 22, 2024

(54) POWER RECEIVER FOR WIRELESS POWER SUPPLY SYSTEM AND ELECTRONIC DEVICE

(71) Applicant: Murata Manufacturing Co., Ltd., Kyoto-fu (JP)

(72) Inventors: Kiyokazu Yamada, Nagaokakyo (JP); Osamu Miki, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 533 days.

(21) Appl. No.: 17/539,958

(22) Filed: Dec. 1, 2021

(65) Prior Publication Data
US 2022/0094203 A1 Mar. 24, 2022

Related U.S. Application Data

(63) Continuation of application No. PCT/JP2020/004221, filed on Feb. 5, 2020.

(30) Foreign Application Priority Data

Jun. 3, 2019 (JP) .................................. 2019-103844

(51) Int. Cl.
*H02J 50/00* (2016.01)
*H02J 7/00* (2006.01)
*H02J 50/12* (2016.01)

(52) U.S. Cl.
CPC .......... *H02J 50/005* (2020.01); *H02J 7/0045* (2013.01); *H02J 50/12* (2016.02)

(58) Field of Classification Search
CPC .................................................... H02J 50/005
(Continued)

(56) References Cited

U.S. PATENT DOCUMENTS 5,246,790 A * 9/1993 Mooney .............. G05D 1/0033
429/97
6,208,115 B1 * 3/2001 Binder ..................... H02J 7/02
429/10
(Continued)

FOREIGN PATENT DOCUMENTS

JP H11-234913 A 8/1999
JP 2004-312888 A 11/2004
(Continued)

OTHER PUBLICATIONS

International Search Report issued in PCT/JP2020/004221; mailed Mar. 10, 2020.
(Continued)

*Primary Examiner* — Jerry D Robbins
(74) *Attorney, Agent, or Firm* — Studebaker & Brackett PC

(57) ABSTRACT

A power receiver includes an outer case shaped to house a secondary battery, a power reception coil member disposed in the outer case, and a circuit board disposed in the outer case. On the circuit board, a power reception circuit electrically connected to a coil conductor of the power reception coil member and a charging circuit configured to charge and discharge the secondary battery are provided. The outer case includes a first outer case member near the power reception coil member and a second outer case member forming the outer case in combination with the first outer case member. The first outer case member has, for example, a flat surface, is disposed nearer to an external power transmission coil than the second outer case member, and has a structure with which the coil conductor of the power reception coil member and the power transmission coil can face each other.

20 Claims, 14 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 9,343,922 B2* | 5/2016 | McCauley | ............. | H02J 50/12 |
| 2007/0222681 A1* | 9/2007 | Greene | ................ | H02J 50/005 |
| | | | | 343/702 |
| 2009/0267560 A1* | 10/2009 | Toya | ....................... | H02J 50/40 |
| | | | | 320/108 |
| 2010/0194334 A1* | 8/2010 | Kirby | ...................... | H02J 50/70 |
| | | | | 320/108 |
| 2013/0285606 A1* | 10/2013 | Ben-Shalom | ............ | H04B 5/79 |
| | | | | 320/108 |
| 2014/0091756 A1* | 4/2014 | Ofstein | ................. | H02J 7/0044 |
| | | | | 320/108 |
| 2014/0176067 A1* | 6/2014 | Suzuki | .................. | H01M 10/46 |
| | | | | 320/108 |
| 2015/0061581 A1* | 3/2015 | Ben-Shalom | ........... | H01F 38/14 |
| | | | | 320/108 |
| 2018/0109148 A1* | 4/2018 | Meng | ..................... | H04B 5/266 |
| 2019/0115630 A1* | 4/2019 | Roohparvar | ......... | H01M 6/5011 |
| 2020/0161903 A1* | 5/2020 | Oster | .................... | H02J 50/005 |
| 2021/0265870 A1* | 8/2021 | Veysi | .................... | H02J 50/001 |

FOREIGN PATENT DOCUMENTS

| | | |
|---|---|---|
| JP | 2013-038967 A | 2/2013 |
| JP | 2013-070581 A | 4/2013 |
| JP | 5798407 B2 | 10/2015 |
| JP | 6357278 B2 | 7/2018 |
| WO | 2014/181462 A1 | 11/2014 |

OTHER PUBLICATIONS

Written Opinion of the International Searching Authority issued in PCT/JP2020/004221; mailed Mar. 10, 2020.

* cited by examiner

POWER RECEIVER FOR WIRELESS POWER SUPPLY SYSTEM AND ELECTRONIC DEVICE

CROSS-REFERENCE TO RELATED APPLICATIONS

This application claims benefit of priority to International Patent Application No. PCT/JP2020/004221, filed Feb. 5, 2020, and to Japanese Patent Application No. 2019-103844, filed Jun. 3, 2019, the entire contents of each are incorporated herein by reference.

BACKGROUND

Technical Field

The present disclosure relates to a power receiver that receives wirelessly supplied power.

Background Art

International Publication No. 2014/181462 discloses a rechargeable battery used in a wireless charging method. The rechargeable battery disclosed in International Publication No. 2014/181462 includes a cylindrical battery body and a power reception coil. The power reception coil is wound in at most a single layer around the outer peripheral side surface of the battery body.

Japanese Patent No. 5798407 discloses a contactless rechargeable secondary battery. The contactless rechargeable secondary battery disclosed in Japanese Patent No. 5798407 includes multiple power reception coils. Each of the multiple power reception coils is ring-shaped.

SUMMARY

However, there is a case where the rechargeable battery disclosed in International Publication No. 2014/181462 cannot achieve high power efficiency in receiving power depending on the installed condition of the rechargeable battery. In the contactless rechargeable secondary battery disclosed in Japanese Patent No. 5798407, all of the power reception coils do not contribute to coupling with a power transmission coil. The power reception coil that is not coupled with the power transmission coil decreases power reception efficiency.

Accordingly, the present disclosure provides a power receiver capable of receiving power with a high degree of power efficiency with more certainty in a wireless power supply system.

A power receiver for a wireless power supply system according to the present disclosure includes an outer case shaped to house a secondary battery, a power reception coil disposed in the outer case, a power reception circuit electrically connected to the power reception coil, a charging circuit configured to charge the secondary battery, and a discharge output unit configured to discharge the secondary battery. The power reception circuit, the charging circuit, and the discharge output unit are disposed in the outer case. The outer case includes a first member near the power reception coil and a second member forming the outer case in combination with the first member. The first member is disposed nearer to an external power transmission coil than the second member, differs from the second member in shape, and has a structure with which a degree of magnetic coupling between the power reception coil and the power transmission coil is higher than a degree of magnetic coupling between the power reception coil and the power transmission coil when the power reception coil is disposed near the second member.

With this structure in which the first member is nearer to the power reception coil than that second member, the power reception coil is close to the power transmission coil. Accordingly, the degree of magnetic coupling between the power reception coil and the power transmission coil can be increased.

According to the present disclosure, power can be received with a high degree of power efficiency with more certainty in a wireless power supply system.

DETAILED DESCRIPTION

First Embodiment

Figure 1:
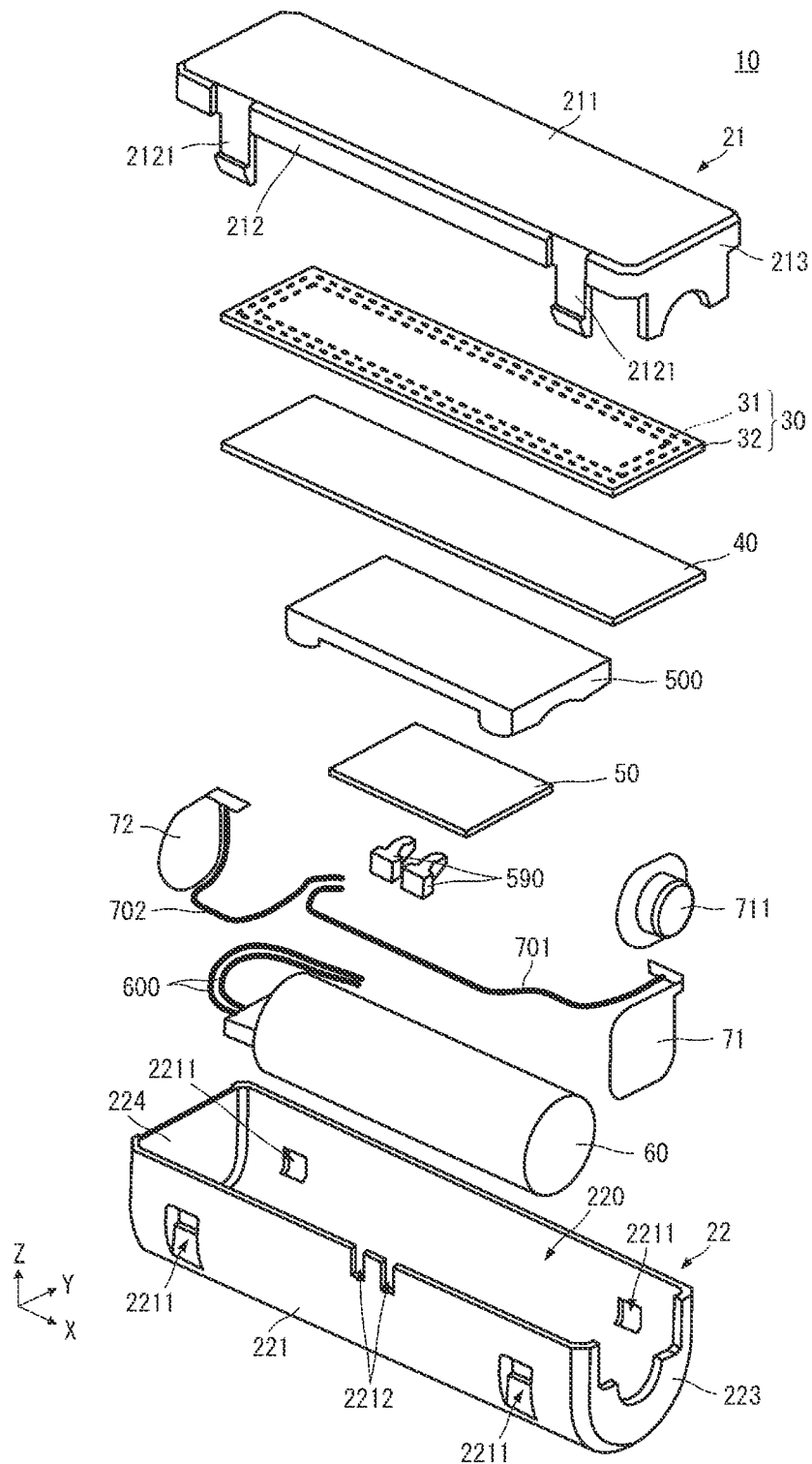
FIG. 1 is an exploded perspective view of a power receiver according to a first embodiment.
Figure 2:
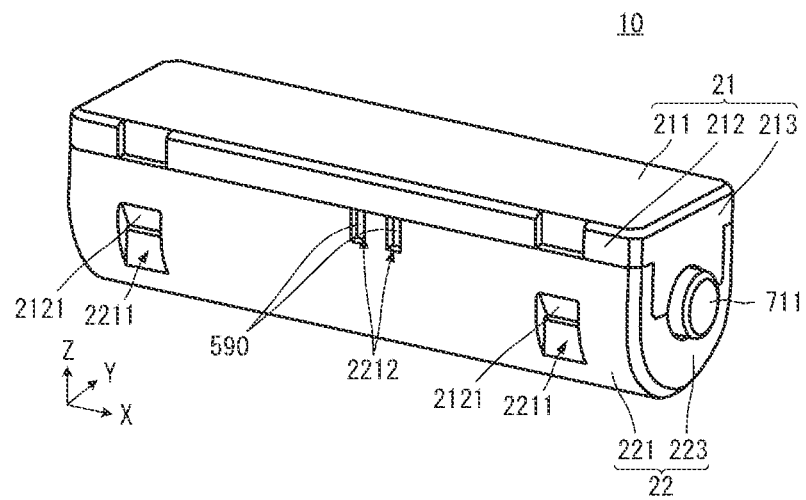
FIG. 2 is an external perspective view of a power receiver according to the first embodiment.
Figure 3A:
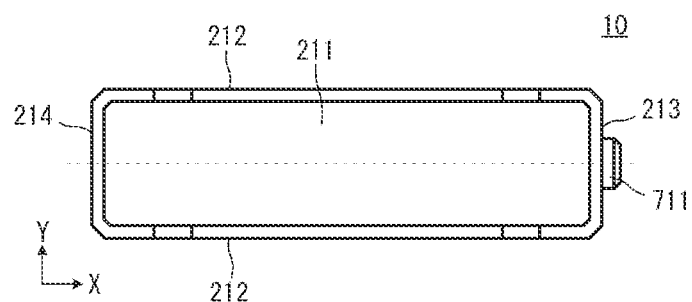
FIG. 3A is a plan view of a power receiver according to the first embodiment.
Figure 3B:
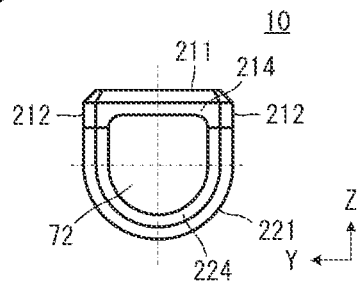
FIG. 3B is a first end view of the power receiver according to the first embodiment.
Figure 3C:
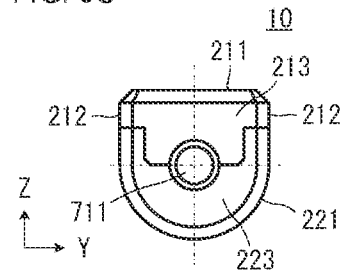
FIG. 3C is a second end view of the power receiver according to the first embodiment.
Figure 3D:
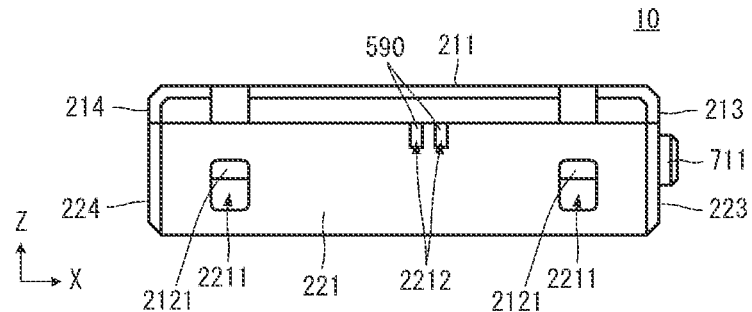
FIG. 3D is a side view of the power receiver according to the first embodiment.
Figure 4:
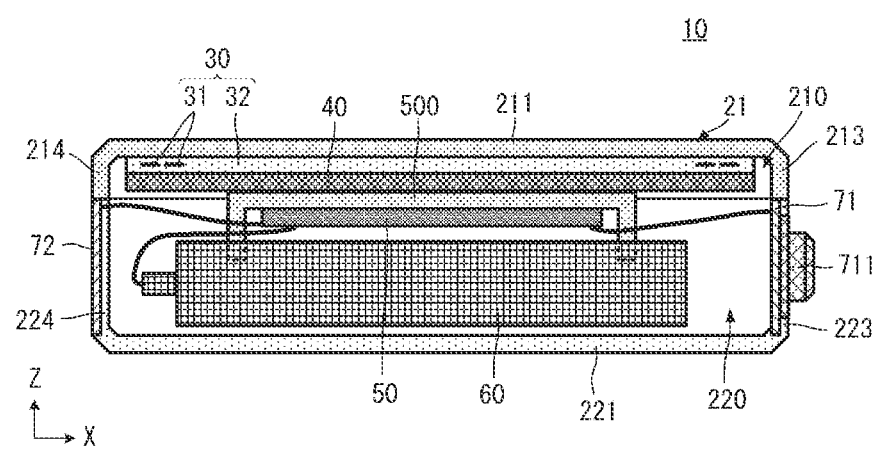
FIG. 4 is a cross-sectional side view of a power receiver according to the first embodiment.
Figure 5:
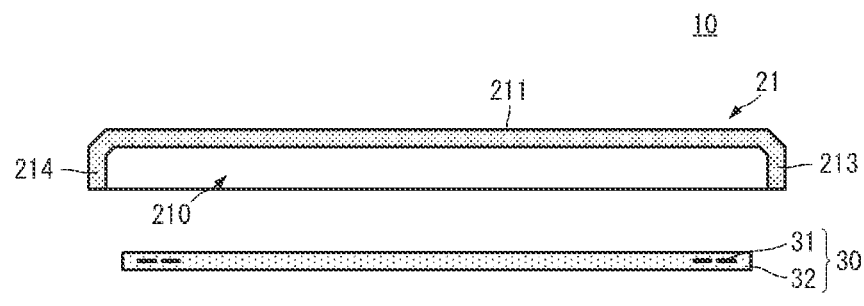
FIG. 5 is an exploded side view of a power receiver according to the first embodiment illustrating the structure of the power receiver.
Figure 5:
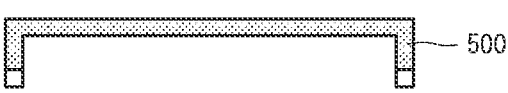
Figure 5:
Figure 5:
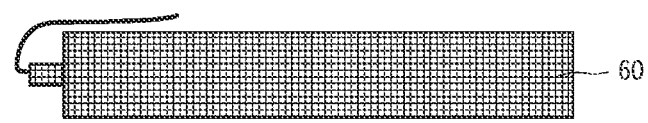
Figure 5:
Figure 5:
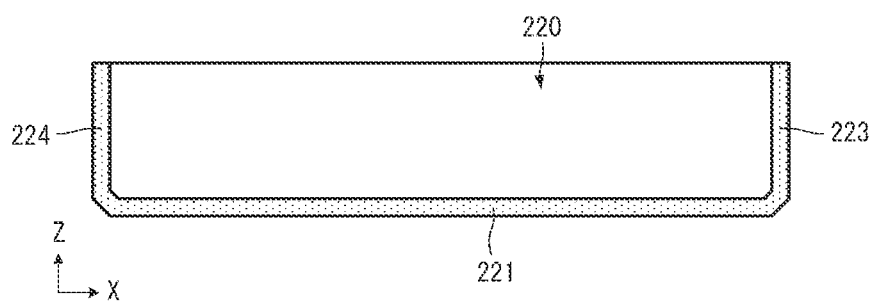
Figure 6:
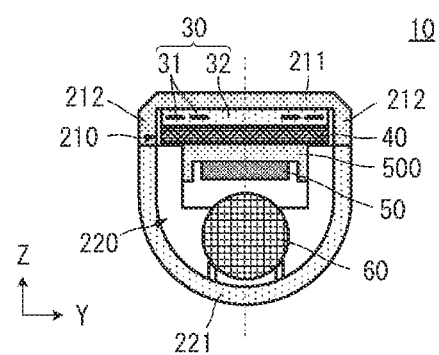
FIG. 6 is a cross-sectional end view of a power receiver according to the first embodiment.

A power receiver for a wireless power supply system according to the first embodiment of the present disclosure and an electronic device in which the power receiver is to be placed will be described with reference to drawings. FIG. 1 is an exploded perspective view of a power receiver according to the first embodiment. FIG. 2 is an external perspective view of a power receiver according to the first embodiment. FIG. 3A is a plan view of a power receiver according to the first embodiment, FIG. 3B is a first end view of the power receiver according to the first embodiment, FIG. 3C is a second end view of the power receiver according to the first embodiment, and FIG. 3D is a side view of the power receiver according to the first embodiment. FIG. 4 is a cross-sectional side view of a power receiver according to the first embodiment. FIG. 5 is an exploded side view of a power receiver according to the first embodiment illustrating the structure of the power receiver. FIG. 6 is a cross-sectional end view of a power receiver according to the first embodiment. Dimensions in respective drawings are adjusted for ease of explanation.

As illustrated in FIGS. 1, 2, 3A to 3D, 4, 5, and 6, a power receiver 10 includes a first outer case member 21, a second outer case member 22, a power reception coil member 30, a magnetic sheet 40, a circuit board 50, a secondary battery 60, a positive electrode 71, a negative electrode 72, a board fixing member 500, a light guide member 590, and a positive adapter electrode 711.

(Structure of Outer Case)

The first outer case member 21 and the second outer case member 22 are made of an insulating material (e.g., an insulating resin). In general, a fit between the first outer case member 21 and the second outer case member 22 forms an "outer case" according to the present disclosure. The first outer case member 21 corresponds to a "first member" according to the present disclosure, and the second outer case member 22 corresponds to a "second member" according to the present disclosure.

The first outer case member 21 includes a wall 211, two walls 212, a wall 213, and a wall 214.

The wall 211 extends in the X direction and the Y direction, which are two directions perpendicular to each other, and is flat and substantially rectangular in shape in plan view. The wall 211 is long in the X direction and short in the Y direction.

The two walls 212 extend in a direction perpendicular to the flat surface of the wall 211. The two walls 212 extend along the sides of the wall 211 in the X direction. One of the two walls 212 is disposed at one of the two sides of the wall 211, and the other one of the two walls 212 is disposed at the other one of the two sides of the wall 211.

The walls 213 and 214 extend in the direction perpendicular to the flat surface of the wall 211. The wall 213 extends along one of the sides of the wall 211 in the Y direction, and the wall 214 extends along the other one of the sides of the wall 211 in the Y direction. The wall 213 is disposed at one end of the wall 211 in the X direction, and the wall 214 is disposed at the other end of the wall 211 in the X direction. The walls 213 and 214 are connected to the two walls 212.

With this structure, the first outer case member 21 has space 210 surrounded by the wall 211, the two walls 212, the wall 213, and the wall 214. The space 210 has a substantially rectangular parallelepiped shape.

The second outer case member 22 includes walls 221, 223, and 224.

The wall 221 has a flat portion and an arc portion. The arc portion curves with a predetermined curvature radius and is semiround in cross section (cross section in the Y-Z plane in, for example, FIG. 1). The flat portion is connected to the sides of the arc portion to extend in the Z direction. Accordingly, the wall 221 is U-shaped in cross section. The wall 221 is long in the X direction and short in the Y direction.

The wall 223 is disposed at one end of the wall 221 in the X direction. The wall 223 has a flat shape parallel to the Y-Z plane. The wall 223 is disposed at one end of the wall 221 in the X direction and is connected to the wall 221. The wall 224 has a flat shape parallel to the Y-Z plane. The wall 224 is disposed at the other end of the wall 221 in the X direction and is connected to the wall 221.

With this structure, the second outer case member 22 has space 220 surrounded by the walls 221, 223, and 224. That is, the second outer case member 22 is substantially semi-cylindrical in shape, and the space 220 has a substantially semicolumnar shape obtained by coupling a semicolumn and a substantially rectangular parallelepiped.

Thus, the first outer case member 21 and the second outer case member 22 are differ in shape and have different appearance shapes.

A fit between the first outer case member 21 and the second outer case member 22 forms a cylindrical outer case. The space 210 in the first outer case member 21 and the space 220 in the second outer case member 22 are therefore communicated with each other, so that the internal space of the outer case is formed. The internal space of the outer case has a shape obtained by coupling a semicolumn and a substantially rectangular parallelepiped.

In this structure, a part of the cylindrical outer case in a circumferential direction is a flat surface that is the wall 211 of the first outer case member 21 and the other part is an arc surface that is the wall 221 of the second outer case member 22. Accordingly, a user can easily distinguish between the first outer case member 21 and the second outer case member 22 and easily recognize the orientation of the power receiver 10.

Specifically, the fit is performed by fitting protrusions 2121 formed in the walls 212 of the first outer case member 21 into fitting grooves 2211 formed in the wall 221 of the second outer case member 22. As a result, the first outer case member 21 and the second outer case member 22 form a detachable fitting shape.

The outer shape has substantially the same shape and substantially the same size as, for example, AA dry cells. The dimension of the outer shape is an example, and the outer shape may be the same as that of another type of dry cells.

(Internal Structure of the Power Receiver 10)

The power reception coil member 30, the magnetic sheet 40, the circuit board 50, the secondary battery 60, the positive electrode 71, the negative electrode 72, the board fixing member 500, and the light guide member 590 are disposed in the internal space of the outer case.

The power reception coil member 30 has a flat film shape having a main surface. The power reception coil member 30 includes a coil conductor 31 and a base member 32. The base member 32 has a flat film shape having a main surface and has an insulating property. The power reception coil member 30 is disposed to be in contact with, for example, the wall 211 of the first outer case member 21.

The coil conductor 31 is formed by a wound linear conductor. The coil conductor 31 has an opening portion with a predetermined area in the center of the winding. The coil conductor 31 is disposed on the base member 32. The surface on which the winding of the coil conductor 31 is formed is parallel to the main surface of the base member 32.

The power reception coil member 30 is disposed adjacent to the first outer case member 21. The main surface of the power reception coil member 30 is substantially parallel to the wall 211 of the first outer case member 21. With this structure, when a power transmission coil is disposed near the first outer case member 21 as will be described below, the coil conductor 31 and a power transmission coil 900 (see FIGS. 7 and 10) face each other. That is, with the structures of the first outer case member 21 and the power reception coil member 30, the coil conductor 31 and the power transmission coil 900 (see FIGS. 7 and 10) can face each other. The power receiver 10 can efficiently receive power with this structure.

It is desired that the main surface of the base member 32 have substantially the same area as the surface of the wall 211 of the first outer case member 21 on the side where the space 210 is located and the coil conductor 31 be disposed along and near the four sides of the main surface of the base member 32. That is, the plane area of the power reception coil member 30 is substantially the same as that (the area of the flat surface) of the wall 211 of the first outer case member 21. With the coil conductor 31 and the base member 32 having the above structure, power reception efficiency can be increased as compared with the case where the coil conductor 31 and the base member 32 are smaller in size. For example, the area of the outer shape of the coil conductor 31 may have half or more of the area of the wall 211 of the first outer case member 21. The outer shape of the coil conductor 31 can be adjusted as appropriate in accordance with the specification of the power receiver 10. For example, the power receiver 10 having the shape of AA dry cells can obtain predetermined power reception performance when the area of the outer shape of the coil conductor 31 is half or more of the area of the wall 211 of the first outer case member 21.

The magnetic sheet 40 has a flat film shape having a main surface. The magnetic sheet 40 is disposed adjacent to the power reception coil member 30. The magnetic sheet 40 is disposed across the power reception coil member 30 from the wall 211 of the first outer case member 21. The magnetic sheet 40 is disposed to be in contact with the power reception coil member 30. It is desired that the area of the magnetic sheet 40 (the area of the main surface of the magnetic sheet 40) be larger than the plane area of the coil conductor 31. Such disposition of the magnetic sheet 40 can lead to the formation of a closed magnetic circuit w % ben a power transmission coil is disposed to face the power reception coil member 30 as described above. Accordingly, the power receiver 10 can more efficiently receive power.

The circuit board 50 is flat. The circuit board 50 is obtained by forming a conductor pattern on a base made of an insulating material (e.g., an insulating resin). On the circuit board 50, various circuit elements forming a power reception circuit to be described below are disposed.

The circuit board 50 is disposed near the magnetic sheet 40 with the board fixing member 500 interposed therebetween. The circuit board 50 is disposed across the magnetic sheet 40 from the power reception coil member 30. The circuit board 50 is disposed such that the flat surface thereof is parallel to the wall 211 of the first outer case member 21. The circuit board 50 is fixed to the second outer case member 22 using the board fixing member 500.

The secondary battery 60 has a column shape. The secondary battery 60 is, for example, a lithium-ion battery. The secondary battery 60 does not necessarily have to be a lithium-ion battery and may be another secondary battery. The secondary battery 60 does not necessarily have to have a column shape and may have any shape fittable inside the second outer case member 22.

The secondary battery 60 is disposed adjacent to the circuit board 50. The secondary battery 60 is disposed across the circuit board 50 from the magnetic sheet 40. The secondary battery 60 is disposed such that a direction in which the column shape thereof extends is parallel to the longitudinal direction of the second outer case member 22 (the X direction in, for example, FIG. 1). In this state, the secondary battery 60 is housed in the space 220 in the second outer case member 22.

The secondary battery 60 is provided with a wiring line 600. The wiring line 600 is connected to the circuit board 50.

The positive electrode 71 and the negative electrode 72 are flat conductors. The positive electrode 71 is attached to the wall 223 of the second outer case member 22. A wiring line 701 is connected to the positive electrode 71 and the circuit board 50.

The negative electrode 72 is attached to the wall 224 of the second outer case member 22. The negative electrode 72 is exposed to the outside of the wall 224 of the second outer case member 22. A wiring line 702 is connected to the negative electrode 72 and the circuit board 50.

The positive adapter electrode 711 has a protrusion. The positive adapter electrode 711 is in contact with the positive electrode 71. The protrusion portion of the positive adapter electrode 711 is exposed to the outside from the wall 223.

The protrusion portion of the positive adapter electrode 711 functions as a positive electrode when the power receiver 10 is used as a rechargeable battery. The above-described negative electrode 72 functions as a negative electrode w % ben the power receiver 10 is used as a rechargeable battery.

The light guide member 590 is in contact with an opening 2212 formed in the wall 221 of the second outer case member 22. The light guide member 590 guides light emitted by a light-emitting device (e.g., an LED (light-emitting diode)) disposed on the circuit board 50. The light guided by the light guide member 590 is externally output via the opening 2212.

As described above, the shape of the outer case of the power receiver 10 has anisotropy. That is, the power receiver 10 has side surfaces of different shapes in different directions. Accordingly, a user can easily recognize the orientation of the power receiver 10 by appearance and touch. That is, a user can easily determine in which orientation the power receiver 10 should be disposed on a power transmitter. Moreover, a user can easily determine in which orientation the power receiver 10 should be attached to an electronic device.

In the above structure, the magnetic sheet 40 is disposed between the power reception coil member 30 and the circuit board 50. Accordingly, a magnetic field that makes the magnetic coupling between the power transmission coil 900 and the coil conductor 31 of the power reception coil member 30 rarely leaks into the circuit board 50 and the secondary battery 60. The occurrence of the case can therefore be suppressed where a magnetic flux is interlinked across the conductor portion of the circuit board 50 and the casing of the secondary battery 60 and an eddy current is generated. A loss such as heat generation caused by an eddy current is therefore reduced.

In the above description, the entirety of the wall 211 of the first outer case member 21 has a flat surface in the longitudinal direction (the direction in which the cylindrical outer case extends). However, at least a part of the wall 211 of the first outer case member 21 may have a flat surface in the longitudinal direction.

In the above description, the first outer case member 21 and the second outer case member 22 fit. However, the first outer case member 21 and the second outer case member 22 may be fixed to each other using, for example, a screw or an adhesive.

(Supply of Power to (Charging of) the Power Receiver 10)

Figure 7:
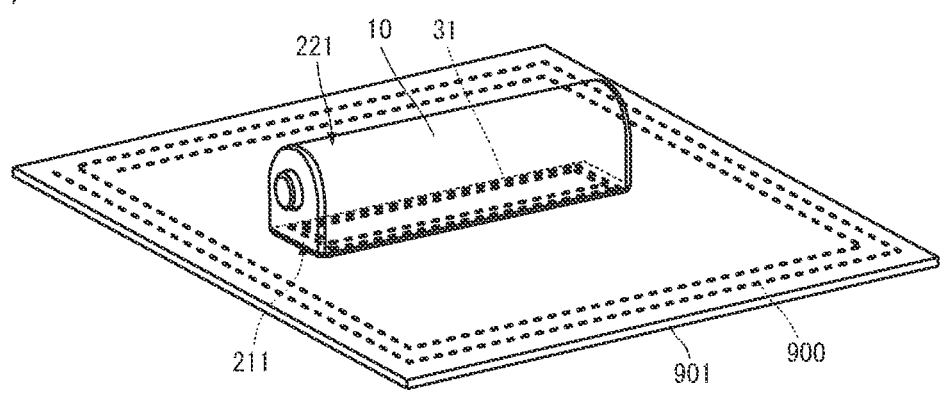
FIG. 7 is an external perspective view of a power receiver illustrating a state where the power receiver is charged.

FIG. 7 is an external perspective view of a power receiver illustrating a state where the power receiver is charged. As illustrated in FIG. 7, a power transmitter includes the power transmission coil 900 and a power transmission stand 901. The power transmission coil 900 is formed of a wound linear conductor pattern. The power transmission coil 900 is formed on the power transmission stand 901. The power transmission coil 900 is disposed such that the opening surface of a winding is substantially parallel to the surface of the of the power transmission stand 901.

When the supply of power to the power receiver 10 itself is performed, the power receiver 10 is disposed on the power transmission stand 901. As described above, the outer case of the power receiver 10 has a flat surface formed by the wall 211 and an arc surface formed by the wall 221. The shape of the outer case of the power receiver 10 in the circumferential direction has anisotropy with respect to the shape thereof in the longitudinal direction, allowing a user to dispose the power receiver 10 on the power transmission stand 901 while checking the shape of the power receiver 10. Specifically, a user can easily dispose the power receiver 10 such that the flat surface of the power receiver 10 is in contact with the surface of the power transmission stand 901.

As described above, the coil conductor 31 of the power reception coil member 30 is disposed near the flat surface. When the power receiver 10 is disposed such that the flat surface thereof is in contact with the surface of the power transmission stand 901, a user can easily dispose the power receiver 10 on the power transmission stand 901 such that high power reception efficiency is obtained.

The flat surface of the power receiver 10 is placed on the surface of the flat power transmission stand 901. Accordingly, after the placement of the power receiver 10 on the power transmission stand 901, the power receiver 10 is prevented from rolling. The power receiver 10 can therefore continuously receive power with a high degree of power reception efficiency.

Although not illustrated, the power receiver 10 includes a light-emitting device. The light emitting state of the light-emitting device can be visually recognized from the outside. By causing the light-emitting device to perform light emission on the basis of a power reception state (charge state), a user can easily visually recognize the power reception state. Although the power receiver 10 includes alight-emitting device, the notification of a power reception state does not necessarily have to be performed using light and may be performed using, for example, sound, vibration, and data communication.

(Placement of the Power Receiver 10 in Electronic Device and Supply of Power to (Charging of) the Power Receiver 10 Placed in Electronic Device)

Figure 8A:
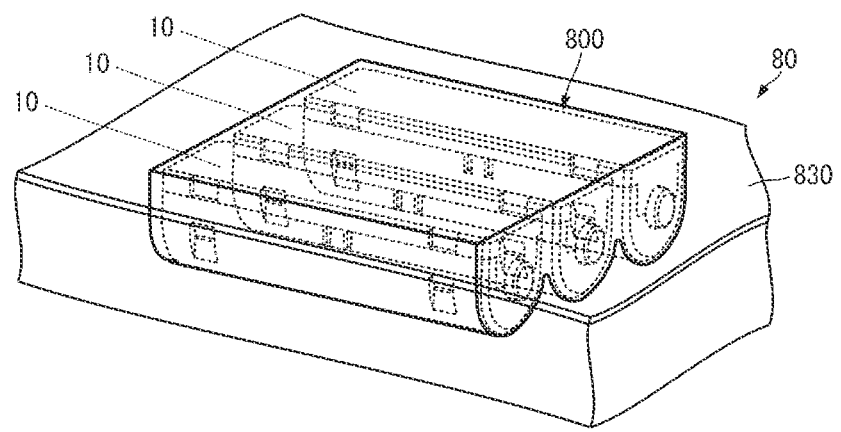
FIG. 8A is a perspective view of a power receiver according to the first embodiment placed in an electronic device.
Figure 8B:
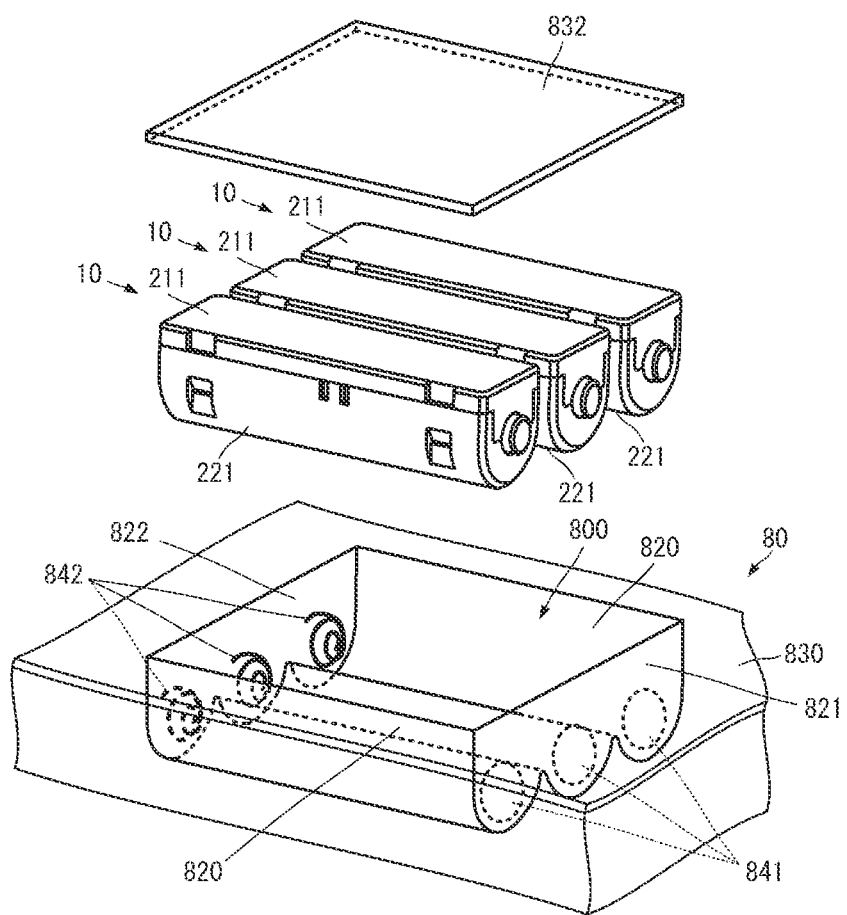
FIG. 8B is an exploded perspective view of the power receiver and the electronic device.
Figure 9A:
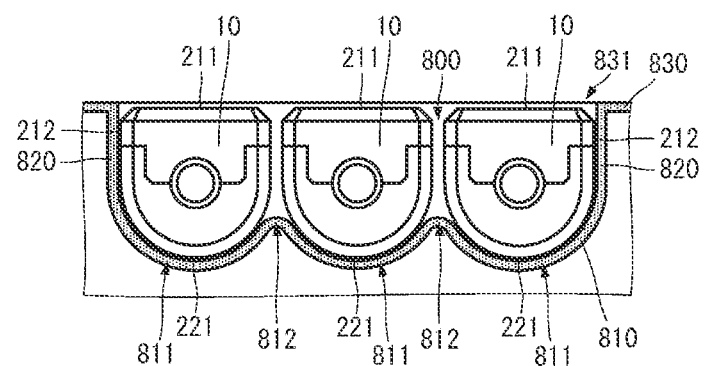
FIG. 9A is a side view of a power receiver according to the first embodiment placed in an electronic device.
Figure 9B:
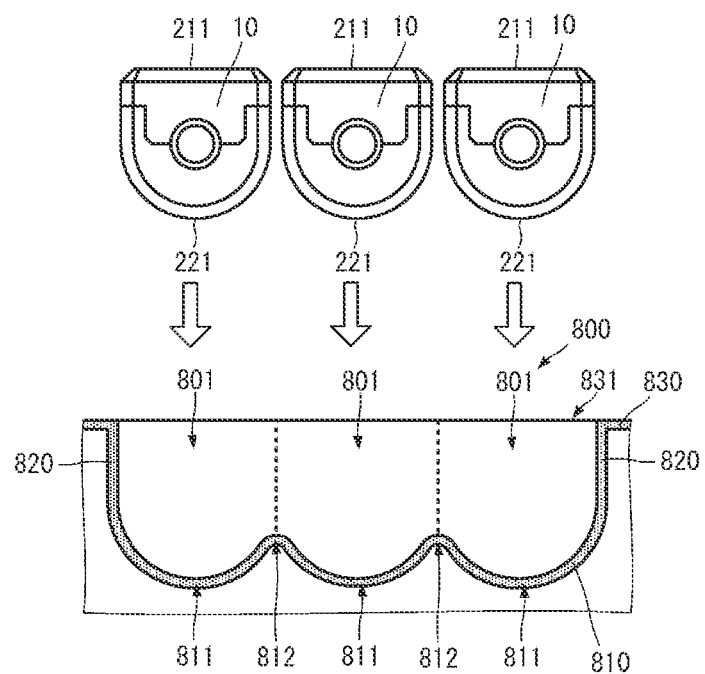
FIG. 9B is an exploded view of the power receiver and the electronic device.

FIG. 8A is a perspective view of a power receiver according to the first embodiment placed in an electronic device, and FIG. 8B is an exploded perspective view of the power receiver and the electronic device. FIG. 9A is aside view of a power receiver according to the first embodiment placed in an electronic device, and FIG. 9B is an exploded view of the power receiver and the electronic device.

As illustrated in FIGS. 8A, 8B, 9A, and 9B, an electronic device 80 includes a battery holder 800. The battery holder 800 is formed by a recess portion provided in a wall 830 of the casing of the electronic device 80 and has an opening portion 831. The battery holder 800 includes a bottom wall 810, side walls 820, a side wall 821, and a side wall 822.

The bottom wall 810 has three discrete portions 811. The discrete portion 811 has an arc shape that is inwardly recessed from end portions in side view. This arc shape is similar to the arc shape of the wall 221 of the power receiver 10. Conversely, the arc shape of the wall 221 of the power receiver 10 is similar to the arc shape of the bottom wall 810 of the battery holder 800. For example, similar shapes mean substantially the same shape or shapes substantially resembling each other. That is, the shape of the battery holder 800 is similar to the outer shape of the second outer case member 22 of the power receiver 10. Conversely, the outer shape of the second outer case member 22 of the power receiver 10 is similar to the shape of the battery holder 800. The three discrete portions 811 are arranged parallel to the flat surface of the wall 830 of the electronic device 80, and adjacent end portions thereof are connected.

The side wall 820 is perpendicular to the wall 830 of the electronic device 80. One end portion of the side wall 820 is connected to an end portion of the bottom wall 810 in a direction in which the three discrete portions 811 are arranged. The other end portion of the side wall 820 is connected to the wall 830. The height of the side wall 820 corresponds to the height of the power receiver 10 and is, for example, substantially the same as that of the power receiver 10.

The side wall 821 is perpendicular to the wall 830. One end portion of the side wall 821 is connected to one end portion of the bottom wall 810 in a direction perpendicular to the direction in which the three discrete portions 811 are arranged. The other end portion of the side wall 821 is connected to the wall 830. On the side wall 821, positive terminal electrodes 841 are disposed.

The side wall 822 is perpendicular to the wall 830. One end portion of the side wall 822 is connected to the other end portion of the bottom wall 810 in the direction perpendicular to the direction in which the three discrete portions 811 are arranged. The other end portion of the side wall 822 is connected to the wall 830. On the side wall 822, negative terminal electrodes 842 are disposed.

The power receiver 10 is housed in the battery holder 800 from the opening portion 831. In this embodiment, the three power receivers 10 are housed in the battery holder 800. More specifically, the three power receivers 10 are housed in the battery holder 800 such that the respective walls 221 of the power receivers 10 are located near the bottom wall 810.

By housing the power receivers 10 such that the walls 221 are located near the bottom wall 810 of the battery holder 800 having the above structure, the walls 221 of the power receivers 10 are parallel to the bottom wall 810 and the side walls 820 of the battery holder 800. That is, the power receivers 10 are housed in the battery holder 800 with no excessive clearance. A connecting portion 812 connecting the adjacent discrete portions 811 protrudes from the bottom surface of the bottom wall 810. Accordingly, the power receivers 10 are housed in the respective discrete portions 811 along the shapes of the connecting portions 812. Thus, the housing of the power receivers 10 can be more easily and more accurately performed.

On the other hand, for example, if the power receivers 10 are housed in the battery holder 800 such that the walls 211 having the flat surfaces are located near the bottom wall 810, the power receivers 10 do not enter the recess portions of the discrete portions 811 of the bottom wall 810. Accordingly, the power receivers 10 are not accurately disposed in the battery holder 800.

Thus, with the structures of the power receiver 10 and the battery holder 800 of the electronic device 80 described in this embodiment, a user can accurately and easily house the power receiver 10 in the electronic device 80.

When the power receiver 10 is housed in the battery holder 800 as above, the positive adapter electrode 711 of the power receiver 10 is connected to the positive terminal electrode 841 of the electronic device 80 and the negative electrode 72 of the power receiver 10 is connected to the negative terminal electrode 842 of the electronic device 80.

In the case where the secondary battery 60 in the power receiver 10 is in the charged state, the electronic device 80 receives power supplied from the power receiver 10. The electronic device 80 is driven with this power to perform predetermined processing or a predetermined operation.

The opening of the battery holder 800 is closed by, for example, a lid 832 in a state where the power receiver 10 is housed in the battery holder 800. The power receiver 10 is therefore protected against an external environment.

In the above structure, the power receiver 10 is housed in the battery holder 800 in a state where the power reception coil member 30 is located near the outside of the electronic device 80. Accordingly, the power receiver 10 placed in the electronic device 80 can receive power supplied from a power transmitter.

Figure 10:
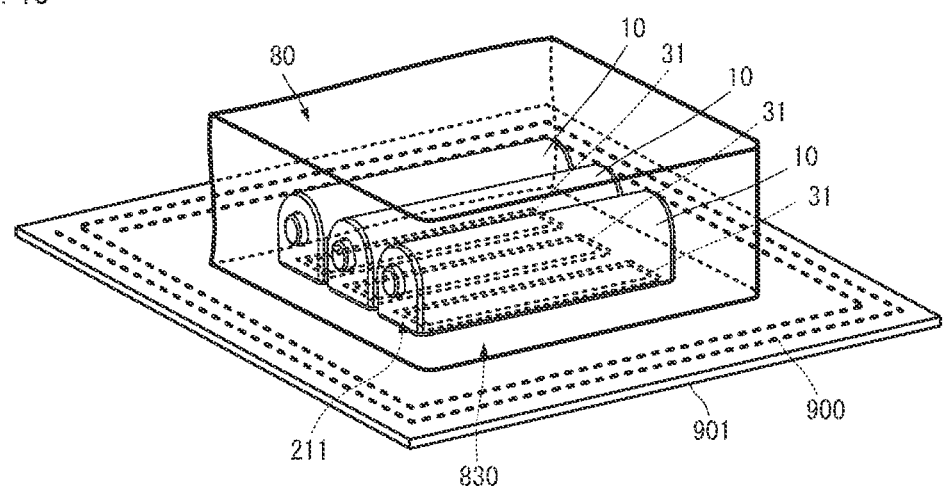
FIG. 10 is an external perspective view of a power receiver placed in an electronic device illustrating a state where the power receiver is charged.

FIG. 10 is an external perspective view of a power receiver placed in an electronic device illustrating a state where the power receiver is charged. As illustrated in FIG. 10, the electronic device 80 is disposed on the surface of the power transmission stand 901 with the wall 830 of the electronic device 80 in contact with the surface of the power transmission stand 901.

When the power receiver 10 is correctly placed in the electronic device 80, the coil conductor 31 of the power reception coil member 30 in the power receiver 10 is located near the power transmission stand 901, that is, the power transmission coil 900. Accordingly, even in a state where the power receiver 10 is housed in the electronic device 80, a user can easily dispose the power receiver 10 (the electronic device 80) on the power transmission stand 901 such that high power reception efficiency is achieved.

In the above description, the three power receivers 10 are used in the electronic device 80, but the number of power receivers 10 may be, for example, one, two, or four or more.

(Exemplary Circuit Configuration of Power Receiver and Wireless Power Supply System)

Figure 11:
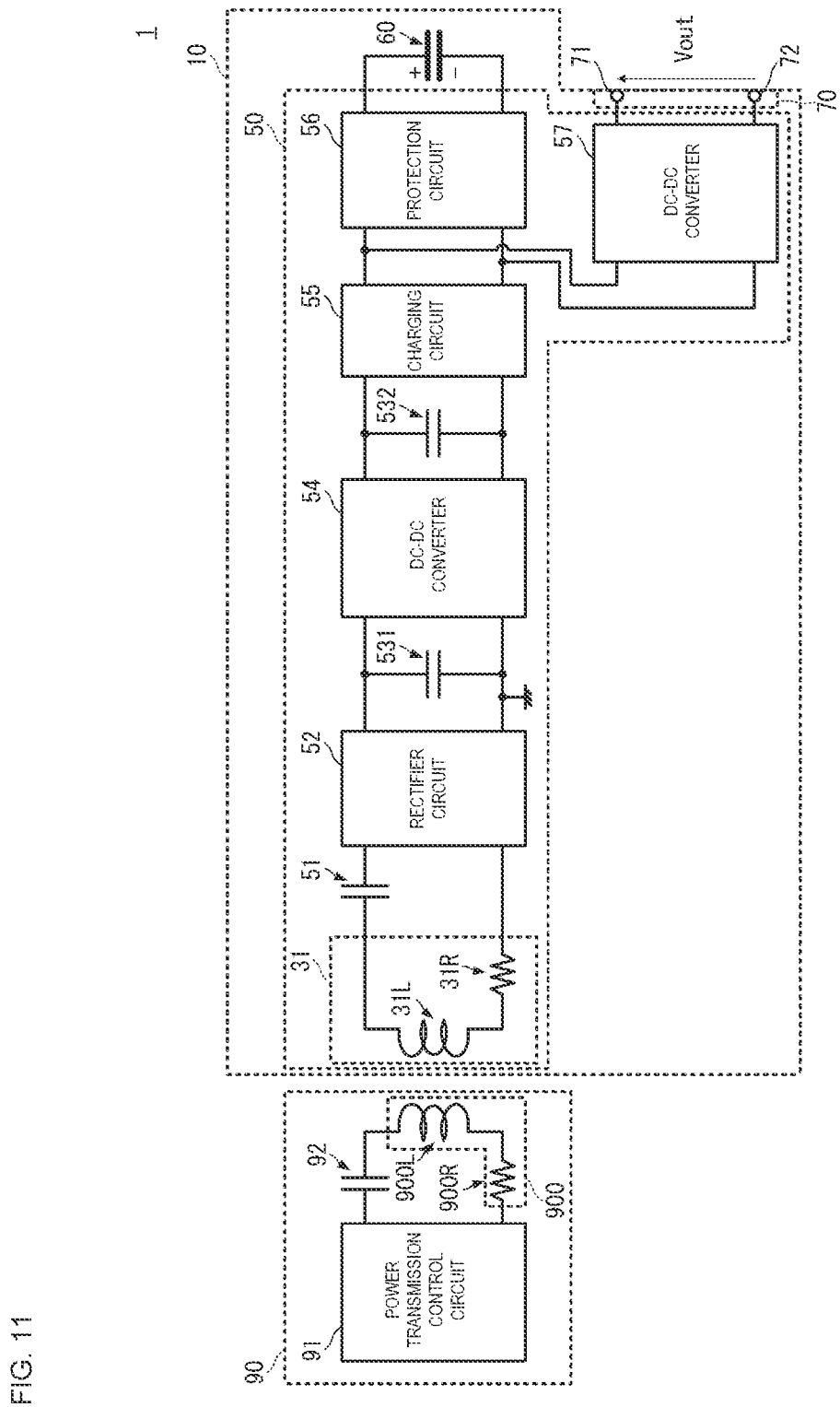
FIG. 11 is a schematic circuit diagram illustrating the circuit configuration of a power receiver according to the first embodiment and a wireless power supply system.

The physical structure of the power receiver 10 has been mainly described above. The power receiver 10 and a wireless power supply system have, for example, the following circuit configuration. FIG. 11 is a schematic circuit diagram illustrating the circuit configuration of a power receiver according to the first embodiment and a wireless power supply system.

A wireless power supply system 1 includes a power transmitter 90 and the power receiver 10. The power transmitter 90 includes a power transmission control circuit 91, a capacitor 92, and a power transmission coil 900 including an inductor 900L and a resistor 900R. A series circuit of the capacitor 92 and the power transmission coil 900 is connected to the power transmission control circuit 91. The inductor 900L and the capacitor 92 form a resonant circuit on a power transmission side. The capacitance of the capacitor 92 and the inductance of the inductor 900L in the power transmission coil 900 have a predetermined resonant frequency.

The power receiver 10 includes the coil conductor 31, a capacitor 51, a rectifier circuit 52, capacitors 531 and 532, a DC-DC converter 54, a charging circuit 55, a protection circuit 56, a DC-DC converter 57, the secondary battery 60, the positive electrode 71, and the negative electrode 72. The coil conductor 31 is a power reception coil, and the combination of the positive electrode 71 and the negative electrode 72 is an output terminal 70 of the power receiver 10. The capacitor 51, the rectifier circuit 52, a capacitor 531, 532, the DC-DC converter 54, the charging circuit 55, and the protection circuit 56 are formed by the electronic components disposed on the above-described circuit board 50.

The capacitor 51 is connected to the power reception coil formed by the coil conductor 31. An inductor 31L and the capacitor 51 form a resonant circuit on a power reception side (power reception resonant circuit). The inductance of the inductor 31L in the power reception coil and the capacitance of the capacitor 51 have substantially the same resonant frequency as the above-described resonant circuit on the power transmission side.

The input terminal of the rectifier circuit 52 is connected to the series circuit of the coil conductor 31 and the capacitor 51. The rectifier circuit 52 is a full-wave rectifier circuit, a half-wave rectifier circuit, or a current doubling rectifier circuit. The capacitor 531 is connected to the output terminal of the rectifier circuit 52. The input terminal of the DC-DC converter 54 is connected to the capacitor 531. The capacitor 532 is connected to the output terminal of the DC-DC converter 54. A circuit formed by the capacitor 51, the rectifier circuit 52, the capacitor 531, the DC-DC converter 54, and the capacitor 532 corresponds to a power reception circuit according to the present disclosure.

The charging circuit 55 is connected to the capacitor 532. The charging circuit 55 employs, for example, the CC (Constant Current) charging method or the CCCV (Constant Current Constant Voltage) charging method. The protection circuit 56 is connected to the charging circuit 55. The secondary battery 60 is connected to the protection circuit 56. The protection circuit 56 performs protection processing against the overvoltage, overcurrent, and overheating of the secondary battery 60. The input terminal of the DC-DC converter 57 is connected to a portion of connection between the charging circuit 55 and the protection circuit 56. The output terminal 70 is connected to the output terminal of the DC-DC converter 57. The DC-DC converter 57 and the output terminal 70 correspond to, for example, a "discharge output unit" according to the present disclosure.

When the secondary battery 60 in the power receiver 10 is charged, the power transmission control circuit 91 in the power transmitter 90 supplies power transmitted by the power transmission coil 900. The power reception coil and the power transmission coil are magnetically coupled. At that time, by causing resonance at the above-described resonant frequency, the power reception coil can receive power supplied from the power transmission coil using the magnetic resonance method. As a result, power reception can be performed with a high degree of efficiency.

The power reception coil outputs the received power to the rectifier circuit 52. The rectifier circuit 52 rectifies an AC received voltage to a DC voltage and outputs the DC voltage. The capacitor 531 smooths the output voltage of the rectifier circuit 52 and outputs the voltage to the DC-DC converter 54. The DC-DC converter 54 performs voltage conversion upon the voltage and outputs a resultant voltage to the charging circuit 55. The capacitor 532 smooths the output voltage of the DC-DC converter 54. The charging circuit 55 charges the secondary battery 60 with the DC reception voltage obtained by smoothing the AC voltage and performing voltage conversion upon the smoothed voltage. At that time, the secondary battery 60 is charged via the protection circuit 56 for the protection thereof. The DC-DC converter 57 performs voltage conversion (voltage adjustment) upon the output voltage of the secondary battery 60 and outputs a resultant voltage to the output terminal 70. The DC-DC converter 57 corresponds to a "voltage adjustment circuit" according to the present disclosure.

Second Embodiment

Figure 12:
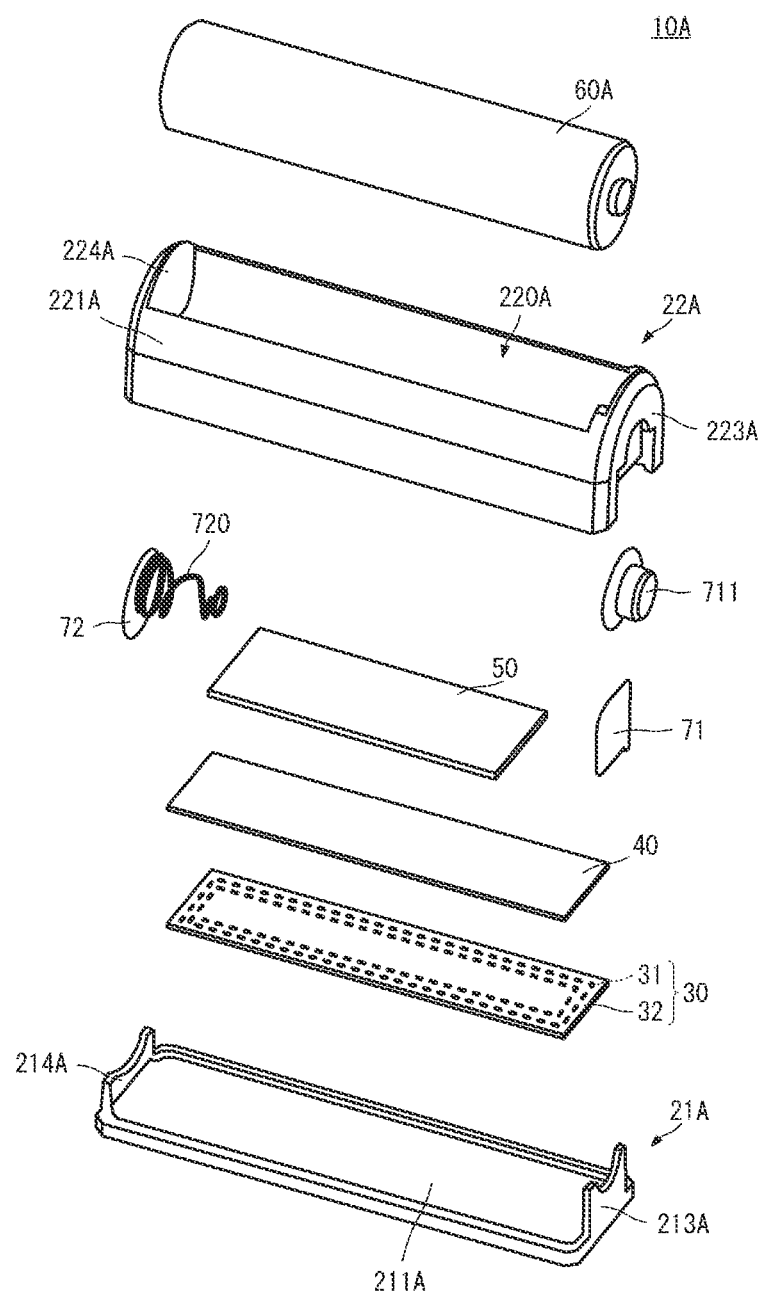
FIG. 12 is an exploded perspective view of a power receiver according to a second embodiment illustrating the structure of the power receiver.

A power receiver according to the second embodiment of the present disclosure will be described with reference to the accompanying drawing. FIG. 12 is an exploded perspective view of a power receiver according to the second embodiment illustrating the structure of the power receiver.

As illustrated in FIG. 12, a power receiver 10A according to the second embodiment differs from the power receiver 10 according to the first embodiment in that a secondary battery 60A is detachable. The other main structure of the power receiver 10A is the same as that of the power receiver 10, and the description of points that are the same as or similar to the points in the power receiver 10 will be omitted when the points are understandable without the description.

The power receiver 10A includes a first outer case member 21A, a second outer case member 22A, the power reception coil member 30, the magnetic sheet 40, the circuit board 50, the secondary battery 60A, the positive electrode 71, the negative electrode 72, the positive adapter electrode 711, and a negative auxiliary electrode 720.

The second outer case member 22A has a recess portion 220A in a wall 221A. The recess portion 220A is formed by the wall 221A and walls 223A and 224A. The recess portion 220A is recessed from the outer surface of the wall 221A. The outer surface of the wall 221A becomes the outside of an outer case obtained by combining the first outer case member 21A and the second outer case member 22A. The recess portion 220A has an arc bottom surface.

The secondary battery 60A has, for example, the shape of a commercially available dry cell, that is, has circular end surfaces and has a column shape that is long in a direction perpendicular to the end surfaces. When the power receiver 10A has the same outer dimensions as AA dry cells, the secondary battery 60A has, for example, the shape of AAA dry cells. The secondary battery 60A is housed in the recess portion 220A.

The positive electrode 71 and the negative auxiliary electrode 720 are exposed in the recess portion 220A. The positive electrode 71 is disposed on the surface of the wall 223A on the side where the recess portion 220A is located. The negative auxiliary electrode 720 is disposed such that the surface of the wall 224A on the side where the recess portion 220A is located protrudes. The negative auxiliary electrode 720 is of a shape having a spring property. The negative auxiliary electrode 720 is connected to the negative electrode 72. By providing in the first outer case member 21A a holding wall 213A having a shape matching the shape of the positive electrode 71 and a holding wall 214A matching the shape of the negative auxiliary electrode 720, the positive electrode 71 and the negative auxiliary electrode 720 are held at respective predetermined positions with more certainty.

When the secondary battery 60A is housed in the recess portion 220A, the positive terminal of the secondary battery 60A is connected to the positive electrode 71 and the negative terminal of the secondary battery 60A is connected to the negative auxiliary electrode 720.

Thus, the power receiver 10A can be obtained using the secondary battery 60A that is, for example, a known commercially available battery usable for another purpose. That is, the power receiver 10A can be used as a secondary battery in a state where the secondary battery 60A is placed therein. With this structure, a user can easily place the power receiver 10A in the electronic device 80 in a correct orientation and allows the power receiver 10A to be wirelessly charged as described above.

In the power receiver 10A, the secondary battery 60A is detachable. Accordingly, the power receiver 10A can also be used as a charging adapter for the secondary battery 60A. Also at that time, a user can place the power receiver 10A in a correct orientation and allows the secondary battery 60A to be wirelessly charged with a high degree of efficiency.

(Exemplary Derivative of Outer Case of Power Receiver)

Figure 13A:
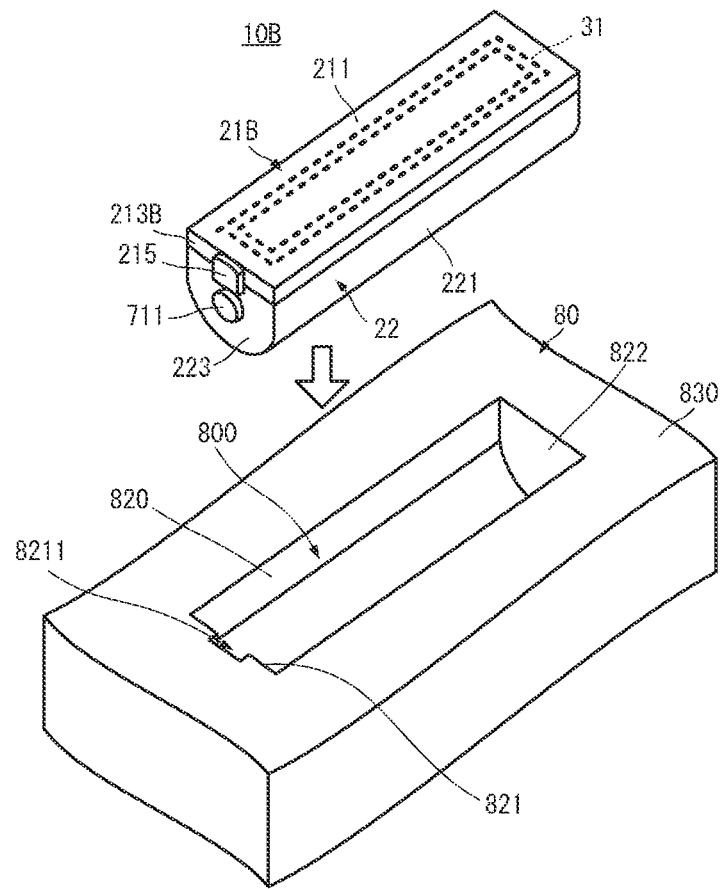
FIGS. 13A and 13B are external perspective views of exemplary derivatives of an outer case of a power receiver.

The outer case of a power receiver does not necessarily have to have the above-described structure and may have the following structure. FIGS. 13A, 13B, 14A, 14B, and 14C are external perspective views of exemplary derivatives of an outer case of a power receiver. The internal structure of the outer cases of the power receivers illustrated in FIGS. 13A, 13B, 14A, 14B, and 14C is the same as that of the power receiver 10 according to the first embodiment, and the description of the same point will be omitted. FIG. 13A also illustrates a part of an electronic device in which the power receiver is to be placed.

A power receiver 10B illustrated in FIG. 13A differs from the power receiver 10 according to the first embodiment in that it includes a first outer case member 21B. The first outer case member 21B includes a protrusion 215. The protrusion 215 externally protrudes from a wall 213B. The protrusion 215 overlaps the positive adapter electrode 711 when the wall 211 of the first outer case member 21B is viewed in plan.

A groove 8211 is formed in the side wall 821 of the battery holder 800 in the electronic device 80. The groove 8211 extends along the direction of depth of the recess portion of the battery holder 800. The width of the groove 8211 is substantially the same as and larger than that (diameter) of the positive adapter electrode 711 of the power receiver 10B.

In this structure, the power receiver 10B cannot be housed in the battery holder 800 if the protrusion 215 does not enter the groove 8211. Accordingly, a user can dispose the power receiver 10B in the battery holder 800 with more certainty.

It is desired that the width of the protrusion 215 be larger than that of the positive adapter electrode 711. In this case, the width of the groove 8211 on the side where the opening of the recess portion of the battery holder 800 is located is increased in accordance with the width of the protrusion 215. Even if the secondary battery 60 is inserted from the protrusion 215, the protrusion 215 does not enter the groove 8211 for the positive adapter electrode 711. Accordingly, it is possible to prevent the secondary battery 60 from being mistakingly inserted in the battery holder 800 upside down.

The width of the groove 8211 may be large near the opening and smaller with increasing depth. As a result, the power receiver 10B can be easily inserted in the battery holder 800 in correct orientations. Based on the structure of the groove 8211, the width of the protrusion 215 may be reduced with decreasing distance to the positive adapter electrode 711 and increased with increasing distance from the positive adapter electrode 711.

Figure 13B:
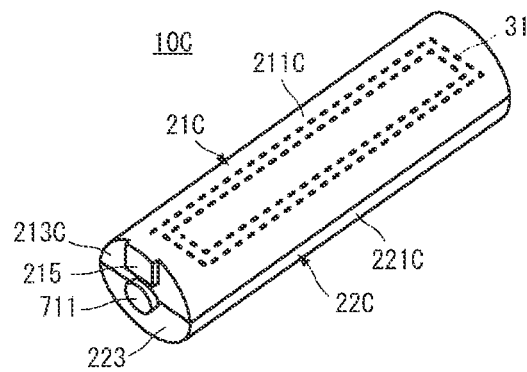

A power receiver 10C illustrated in FIG. 13B differs from the power receiver OB illustrated in FIG. 13A in that it includes a first outer case member 21C. The other structure of the power receiver 10C is the same as that of the power receiver 10B, and the description of the same point will be omitted.

The first outer case member 21C includes walls 211C and 213C. In the wall 213C, the protrusion 215 is formed.

The wall 211C has an arc outer shape in side view (when the wall 213C is viewed from the front). A wall 221C also has an arc outer shape in side view. That is, the power receiver 10C has a substantially column shape. Even with this structure, a user can recognize the position of the power reception coil member 30 by the presence of the protrusion 215.

Figure 14A:
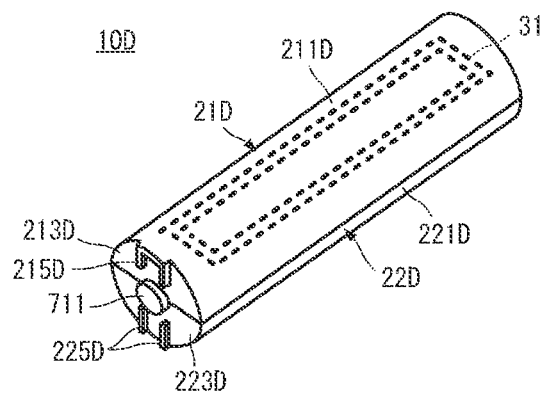
FIGS. 14A, 14B, and 14C are external perspective views of exemplary derivatives of an outer case of a power receiver.

A power receiver 10D illustrated in FIG. 14A differs from the power receiver 10C illustrated in FIG. 13B in that it includes a first outer case member 21D and a second outer case member 22D. The other structure of the power receiver 10D is the same as that of the power receiver 10C, and the description of the same point will be omitted.

The first outer case member 21D includes walls 211D and 213D. The wall 211D has the same shape as the wall 211C of the power receiver 10C. The wall 213D includes a protrusion 215D. The protrusion 215D has a recess portion adjacent to the positive adapter electrode 711 as compared with the protrusion 215. The recess portion is a portion that does not protrude from the wall 213D or the amount of protrusion of which from the wall 213D is smaller than that of the other portion of the protrusion 215D.

The second outer case member 22D includes walls 221D and 223D. The wall 221D has an arc outer shape in side view (when the wall 223D is viewed from the front). That is, the power receiver 10D has a substantially column shape the side view of which is more circular than that of the power receiver 10C. The power receiver 10D therefore assume more closely the shape of the above-described columnar dry cell.

The wall 223D includes a protrusion 225D. The protrusion 225D overlaps the protrusion 215D when the power receiver 10D is viewed from the front (viewed in the direction in which the first outer case member 21D and the second outer case member 22D are arranged). The protrusion 225D has two string portions extending to the positive adapter electrode 711 from the outer surface of the second outer case member 22D on the opposite side of a portion of connection between the second outer case member 22D and the first outer case member 21D. The spacing between the two string portions is substantially the same as the width of the recess portion of the protrusion 215D. In this case, in the groove 8211 in which the positive adapter electrode 711 is to be inserted, two grooves are added for these string portions and the protrusion 215D. It is therefore possible to prevent the secondary battery 60 from being mistakingly inserted in the battery holder 800 upside down.

In this and other structures, grooves of different shapes for protrusions may be formed in a groove for the housing of the positive adapter electrode 711 on the opening side and bottom-surface side of a recess portion of a battery holder and the shape of protrusion of a secondary battery may be changed on the basis of the shapes of the grooves.

Figure 14B:
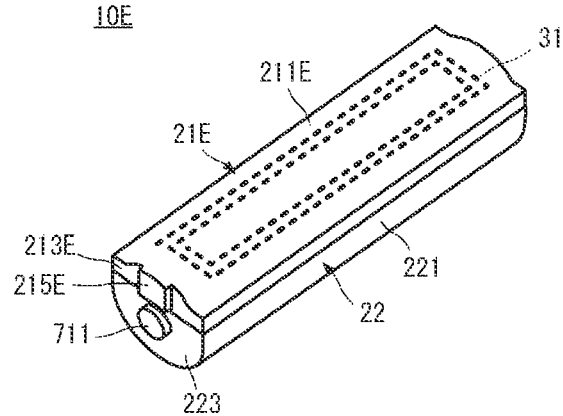

A power receiver 10E illustrated in FIG. 14B differs from the power receiver 10B illustrated in FIG. 13A in that it includes a first outer case member 21E. The other structure of the power receiver 10E is the same as that of the power receiver 10B, and the description of the same point will be omitted.

The first outer case member 21E includes walls 211E and 213E. In the wall 213E, a protrusion 215E is formed. The protrusion 215E has the same structure as the protrusion 215.

The wall 211E inwardly protrudes in an arc shape in side view (when the wall 213E is viewed from the front). That is, the power receiver 10E has a part of the shape of the first outer case member 21B in the power receiver 10B and a part of the shape of the first outer case member 21C in the power receiver 10C. Also with this structure, a user can recognize the position of the power reception coil member 30.

Figure 14C:
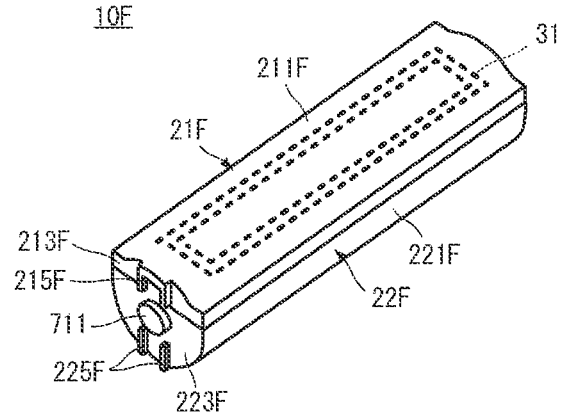

A power receiver 10F illustrated in FIG. 14C differs from the power receiver 10E illustrated in FIG. 14B in that it includes a first outer case member 21F and a second outer case member 22F. The other structure of the power receiver 10F is the same as that of the power receiver 10E, and the description of the same point will be omitted.

The first outer case member 21F includes walls 211F and 213F. The first outer case member 21F differs from the first outer case member 21E in the shape of a protrusion 215F. The protrusion 215F has the same structure as the protrusion 215D of the first outer case member 21D illustrated in FIG. 14A.

The second outer case member 22F includes walls 221F and 223F. The second outer case member 22F differs from the second outer case member 22 in that it includes a protrusion 225F. The protrusion 225F has the same structure as the protrusion 225D of the second outer case member 22D illustrated in FIG. 14A. That is, the outer case of the power receiver 10F has the structure obtained by combining the outer case of the power receiver 10D and the outer case of the power receiver 10E. Also with this structure, a user can recognize the position of the power reception coil member 30.

The structure of an outer case is not limited to these examples. Any shape of an outer case may be employed with which a user can dispose a power receiver such that the power reception coil member 30 in the outer case is close to a power transmission coil when the user charges the power receiver or places the power receiver in an electronic device.

An outer case has an arc shape in the above respective structures, but may have a deformed arc shape such as an elliptic arc or a polygonal shape.

(Derivative of Circuit Configuration)

Figure 15:
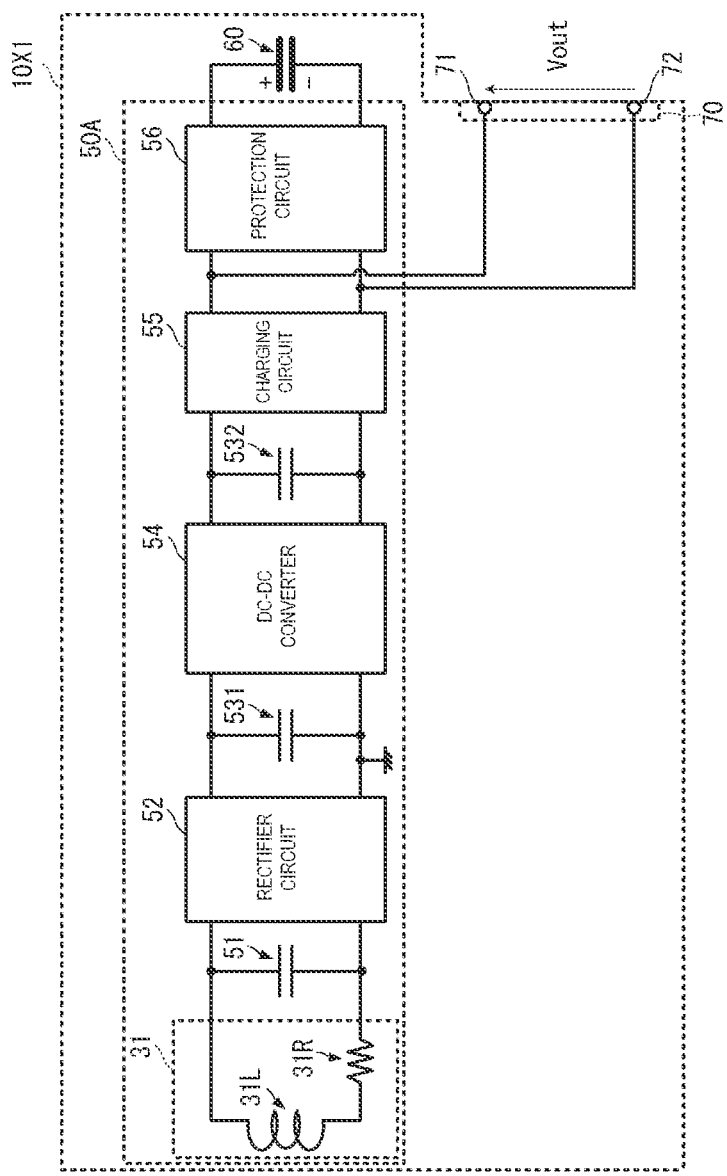
FIG. 15 is a schematic circuit diagram illustrating an exemplary derivative of a circuit configuration of a power receiver.
Figure 16:
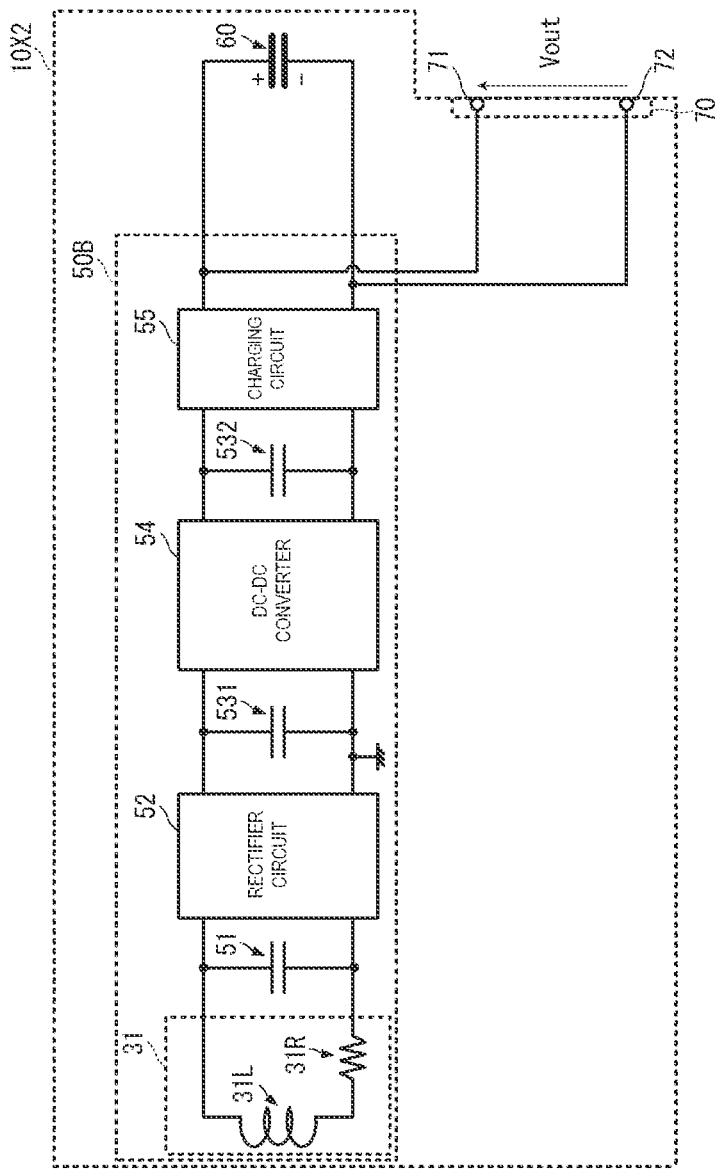
FIG. 16 is a schematic circuit diagram illustrating an exemplary derivative of a circuit configuration of a power receiver.

The circuit configuration of a power receiver is not limited to the above-described configuration and may be the following configuration. FIGS. 15 and 16 are circuit diagrams illustrating exemplary derivatives of a circuit configuration of a power receiver. In FIGS. 15 and 16, the illustration of a power transmitter in a wireless power supply system in which a power receiver is used is omitted, but the power transmitter has the same structure as the power transmitter illustrated in FIG. 11.

A power receiver 10X1 illustrated in FIG. 15 differs from the power receiver 10 illustrated in FIG. 11 in that it does not include the DC-DC converter 57 on a circuit board 50A. When a charging voltage of the secondary battery 60 and an output voltage of the power receiver 10X1 are equal, the DC-DC converter 57 does not necessarily have to be provided as above.

A power receiver 10X2 illustrated in FIG. 16 differs from the power receiver 10X1 illustrated in FIG. 15 in that the protection circuit 56 is not provided. When the secondary battery 60 is not a secondary battery such as a lithium-ion battery that needs electrical protection, the protection circuit 56 does not necessarily have to be provided. The circuit configuration of the power receiver 10X2 can therefore be simplified as compared with the circuit configuration of the power receiver 10X1.

A so-called dry-cell-type power receiver has been exemplified which is longer in a direction perpendicular to circular end surfaces. However, a power receiver may be a so-called button cell or may have another shape such as a rectangular parallelepiped shape.

The above-described structures may be combined as appropriate, and operational effects based on respective combinations can be obtained.

What is claimed is:

1. A power receiver for a wireless power supply system, comprising:
    an outer case shaped to house a secondary battery;
    a power reception coil disposed in the outer case;
    a power reception circuit electrically connected to the power reception coil;
    a charging circuit configured to charge the secondary battery; and
    a discharge output unit configured to discharge the secondary battery, the power reception circuit, the charging circuit, and the discharge output unit being disposed in the outer case,
    wherein the outer case includes,
    a first member near the power reception coil, and
    a second member configuring the outer case in combination with the first member, and
    wherein the first member is disposed nearer to an external power transmission coil than the second member, differs from the second member in shape, and has a structure with which a degree of magnetic coupling between the power reception coil and the power transmission coil is higher than a degree of magnetic coupling between the power reception coil and the power transmission coil when the power reception coil is disposed near the second member.

2. The power receiver for a wireless power supply system according to claim 1, wherein
    the outer case has a cylindrical shape, and
    a part of the cylindrical shape in a circumferential direction is configured by the first member.

3. The power receiver for a wireless power supply system according to claim 2, wherein
    the first member and the second member differ in appearance.

4. The power receiver for a wireless power supply system according to claim 3, wherein
    the first member has a flat surface as an outer surface, and
    the power reception coil is disposed substantially parallel to the flat surface.

5. The power receiver for a wireless power supply system according to claim 4, wherein
    the part of the cylindrical shape in the circumferential direction is substantially entirely configured by the first member in a direction in which the cylindrical shape extends, and
    an outer shape of the power reception coil has an area half or more of an area of the first member.

6. The power receiver for a wireless power supply system according to claim 4, wherein
    the second member is substantially semicylindrical in shape and has substantially the same shape as the part of the casing of a dry cell.

7. The power receiver for a wireless power supply system according to claim 2, wherein
    the second member has substantially the same shape as a part of a casing of a dry cell or a button cell and is shaped to attached to an attachment portion of an electronic device configured to house the power receiver.

8. The power receiver for a wireless power supply system according to claim 1, further comprising:
    a magnetic sheet disposed across the power reception coil from an outer surface of the first member.

9. The power receiver for a wireless power supply system according to claim 1, further comprising:
    the secondary battery disposed in the outer case.

10. The power receiver for a wireless power supply system according to claim 1, further comprising:
    a protection circuit configured to perform charge and discharge control based on a state of the secondary battery to perform protection processing against overvoltage, overcurrent, and overheating of the secondary battery.

11. The power receiver for a wireless power supply system according to claim 1, wherein
    a voltage adjustment circuit is connected to the power reception circuit.

12. The power receiver for a wireless power supply system according to claim 1, wherein
    the outer case has a notification structure with which a visual notification can be performed based on a charge state of the secondary battery.

13. The power receiver for a wireless power supply system according to claim 12, wherein
    the notification structure includes a light-emitting device, and
    based on a light-emitting state of the light-emitting device, a notification of the charge state is performed by allowing light emitted by the light-emitting device to be visually recognized outside the outer case directly or through a light guide member.

14. The power receiver for a wireless power supply system according to claim 1, wherein
    the first member and the second member configure a detachable fitting shape.

15. The power receiver for a wireless power supply system according to claim 1, wherein
    the power reception circuit and the power reception coil configure a power reception resonant circuit.

16. The power receiver for a wireless power supply system according to claim 1, wherein
    the charging circuit is a CC charging circuit or a CCCV charging circuit.

17. An electronic device comprising:
    the power receiver for a wireless power supply system according to claim 1; and
    a device body configured to house the power receiver, wherein
    the device body has a recess portion configured to house the power receiver, and
    the recess portion has a shape similar to an outer shape of the second member.

18. The electronic device according to claim 17, wherein
    the recess portion is shaped to house a plurality of the power receivers and has a shape corresponding to the outer shape of the second member of each of the plurality of power receivers.

19. The electronic device according to claim 17, wherein the recess portion is shaped to house a dry cell and has a shape that is substantially the same as or similar to the outer shape of the second member.

20. The electronic device according to claim 17, wherein the recess portion is shaped to house a button cell and has a shape that is substantially the same as or similar to the outer shape of the second member.

\* \* \* \* \*